US00RE39179E

(19) United States
(12) Reissued Patent
Naunheimer et al.

(10) Patent Number: US RE39,179 E
(45) Date of Reissued Patent: Jul. 11, 2006

(54) ELECTROMECHANICAL DRIVE FOR TRACK-LAYING VEHICLES

(75) Inventors: Harald Naunheimer, Augsburg (DE); Anton Huf, Augsburg (DE)

(73) Assignee: Renk Aktiengesellschaft, Augsburg (DE)

(21) Appl. No.: 10/262,855

(22) Filed: Oct. 2, 2002

Related U.S. Patent Documents

Reissue of:
(64) Patent No.: 6,358,176
Issued: Mar. 19, 2002
Appl. No.: 09/430,943
Filed: Nov. 1, 1999

(30) Foreign Application Priority Data

Nov. 3, 1998 (DE) ..... 198 50 606

(51) Int. Cl.
*F16H 3/72* (2006.01)
*F16H 48/06* (2006.01)
*B60K 1/00* (2006.01)

(52) U.S. Cl. ..... 475/5; 180/65.6; 475/149
(58) Field of Classification Search ..... 180/65.5–65.7, 180/371–2; 475/5, 286, 900, 296
See application file for complete search history.

(56) References Cited

U.S. PATENT DOCUMENTS 1,997,974 A * 4/1935 Moore et al. ..... 172/287
4,799,564 A * 1/1989 Iijima et al. ..... 180/65.5
4,918,344 A * 4/1990 Chikamori et al. ..... 475/149 X
5,087,229 A * 2/1992 Hewko et al. ..... 475/149
5,382,854 A * 1/1995 Kawamoto et al. .... 180/65.6 X
5,562,565 A * 10/1996 Moroto et al. ..... 477/3
5,751,081 A * 5/1998 Morikawa ..... 475/284 X
5,845,732 A * 12/1998 Taniguchi et al. ..... 180/65.6
6,012,538 A * 1/2000 Sonobe et al. ..... 180/65.6 X
6,022,287 A * 2/2000 Klemen et al. ..... 475/5

FOREIGN PATENT DOCUMENTS

DE 3728171 C2 * 6/1989
DE 29803665 * 5/1998
DE 19732637 * 2/1999
GB 2 154 967 * 3/1985
GB 2 183 105 * 5/1987
GB 2 290 363 * 12/1995

* cited by examiner

*Primary Examiner*—Roger Pang
(74) *Attorney, Agent, or Firm*—Cohen, Pontani, Lieberman & Pavane

(57) ABSTRACT

An electromechanical drive for track-laying vehicles in which the two drive sides have no mechanical coupling and permits smaller overall lengths and overall diameters. As a result, the flexibility of the arrangement of the drive components compared is further increased. The drive includes an electric traction motor, at least one variable-speed mechanical gear unit, and at least one brake. At least one of these components is arranged inside the rotor of the electric motor, and the remaining components are arranged laterally at the electric motor in such a way as to lie coaxially in approximately one plane.

6 Claims, 3 Drawing Sheets

ELECTROMECHANICAL DRIVE FOR TRACK-LAYING VEHICLES

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates track laying vehicles, and more particularly to an electromechanical drive for track-laying vehicles.

2. Description of the Related Art

It is known that electric drives for track-laying vehicles, compared with conventional, fully automatic, hydromechanical power-shift transmissions, permit increased flexibility in the component arrangement as well as a more favorable energy management of the vehicle with infinitely variable traction drive. The high demands made on the traction motor and on the power electronics in purely electic drives—without mechanical shift stages—leads to electric motors of large diameters. These motors require a lot of construction space and can only be arranged in vehicles to a limited extent.

Avoiding these disadvantages has led to the development of electromechanical drives. German Patent No. 37 28 171 C2 shows an electromechanical drive block which has an electric motor for the traction drive (traction motor), which is connected in each case to track drive sprockets via differential gear units. The effort of construction of the electric traction drive is drastically reduced by the interposition of a 2-speed gear unit. For the regenerative steering, however, a further electric motor (steering motor) and a mechanical zero shaft which transmit the mechanical output from the one to the other drive side, are necessary. The controlled supply of energy to both electric motors (traction and steering motors) is effected in a purely electrical manner via a generator driven by an internal combustion engine.

SUMMARY OF THE INVENTION

An object of the present invention is to provide a more highly integral, more compact drive which retains the aforementioned advantages.

This and other objects are achieved in accordance with of invention by the realization of a comparatively short overall length of the drive unit by the coaxial arrangement of a plurality of components in the same plane, and by the integration of further elements in the interior space of the rotor of an electric motor.

Due to the mechanical gear stages, it is possible to revert to electric motors which have a smaller output and a substantially smaller diameter. As a result, it is possible, for example, to coaxially drive a side transmission gear of the track drive sprocket attached to the rear hull end of the vehicle. As a result, an additional gear unit for compensating for axial misalignment may be dispensed with.

On account of the short installation length, an access opening, for example, may be provided for the free space between the two drives.

Since the friction brake is arranged of the outside on the output shaft, the braking power which is required by the tracks is absorbed directly and the brake can easily be cooled by ambient air. A further advantage of this arrangement is the ease of maintenance of the brake. The construction of the drive unit permits both electrical and mechanical-hydraulic actuation of the friction brake and of the clutches for the gear-change operations. When traveling around curves, motors on the inside of the curve work as generators, which supply energy to the motors on the outside of the curve via power electronics, as a result of which regenerative steering is possible. The flexibility of the arrangement of the drive components compared with the prior art is further increased in an advantageous manner by the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings wherein like reference numerals depict similar elements throughout the views.

DETAILED DESCRIPTION OF THE PRESENTLY PREFERRED EMBODIMENTS

Figure 1:
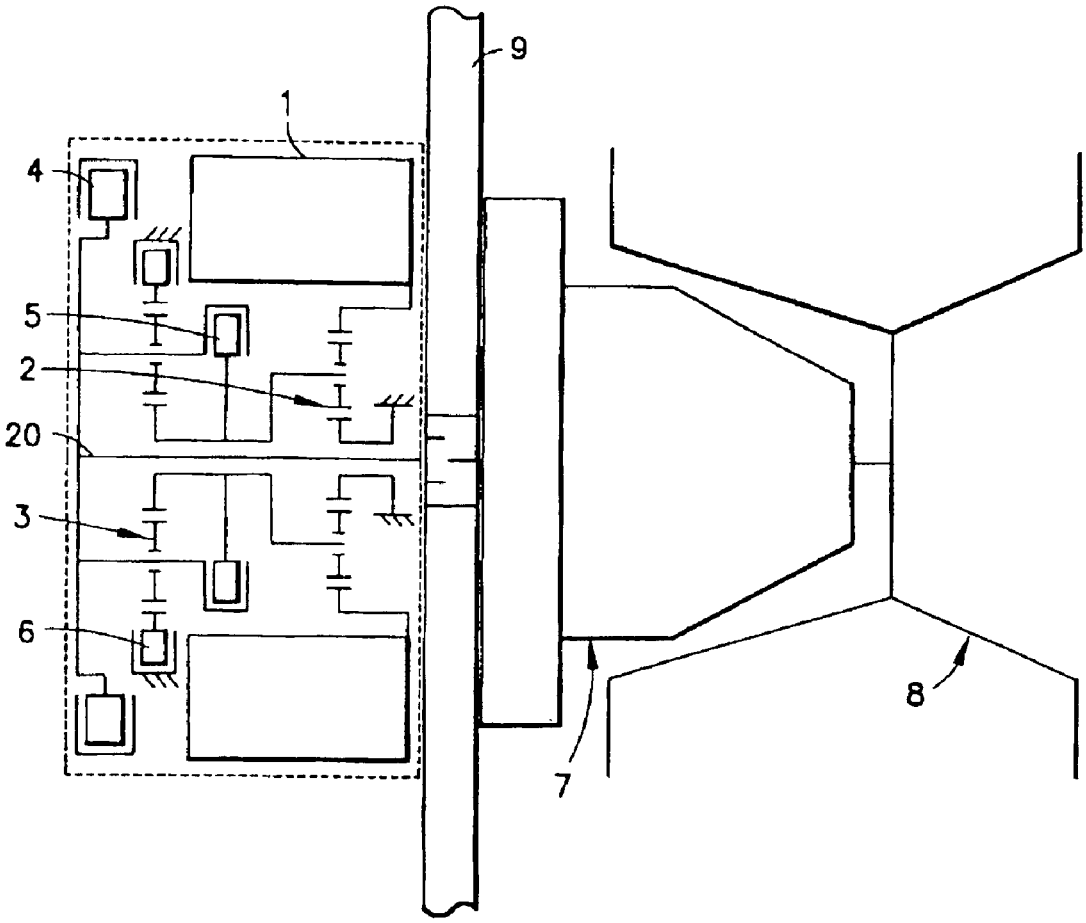
FIG. 1 shows the basic schematic construction of a drive according to an exemplary embodiment of the invention.

The basic construction of an exemplary embodiment of a drive according to the invention is shown in FIG. 1. An electric motor 1 drives the ring gear of an epicyclic gear unit 2, which is provided as a reducing fixed stage. The electric motor may be of a type operable to allow brief operation close to a motor cut-off output. The output of epicyclic gear unit 2 is effected via its revolving web, which, with clutch 5 closed and at the same time clutch 6 open, directly drives the output shaft 20 of the drive. By controlled and thus matched opening of the clutch 5 and closing of the clutch 6, the epicyclic gear unit 2 drives the sun gear of an epicyclic gear unit 3. Since this epicyclic gear unit 3, in this set-up, drives the output shaft 20 via its web. A further gear stage is thus connected in which the revolving planet gears are rotatably mounted. Accordingly, the epicyclic gear units 2, 3 and the clutches 5, 6 comprise a shiftable transmission.

The brake 4 is firmly connected to the output shaft 20 and the web of the epicyclic gear unit 3, but lies coaxially on the outside and partly encloses the epicyclic gear unit 3 and the clutch 6.

According to an exemplary embodiment of the invention, the first gear stage 2 and clutch 5 are arranged in the interior of the electric motor 1 and spatially in series next to the coaxially arranged elements in approximately the same plane-i.e., epicyclic gear unit 3, clutch 6 and brake 4. The brake 4 lying on the outside close to the output can be cooled in a simple manner and is arranged such that it is easy to maintain. It is intended as a parking brake and is connected to the operating brake in order to meet the demand for maximum braking power. In addition, brake 4 performs the task of an auxiliary brake in the event of failure of another braking system.

The drive described is flange-mounted inside a vehicle to its side wall 9. The output shaft 20 outside the vehicle drives a track sprocket 8 via a transmission gear 7.

Figure 2:
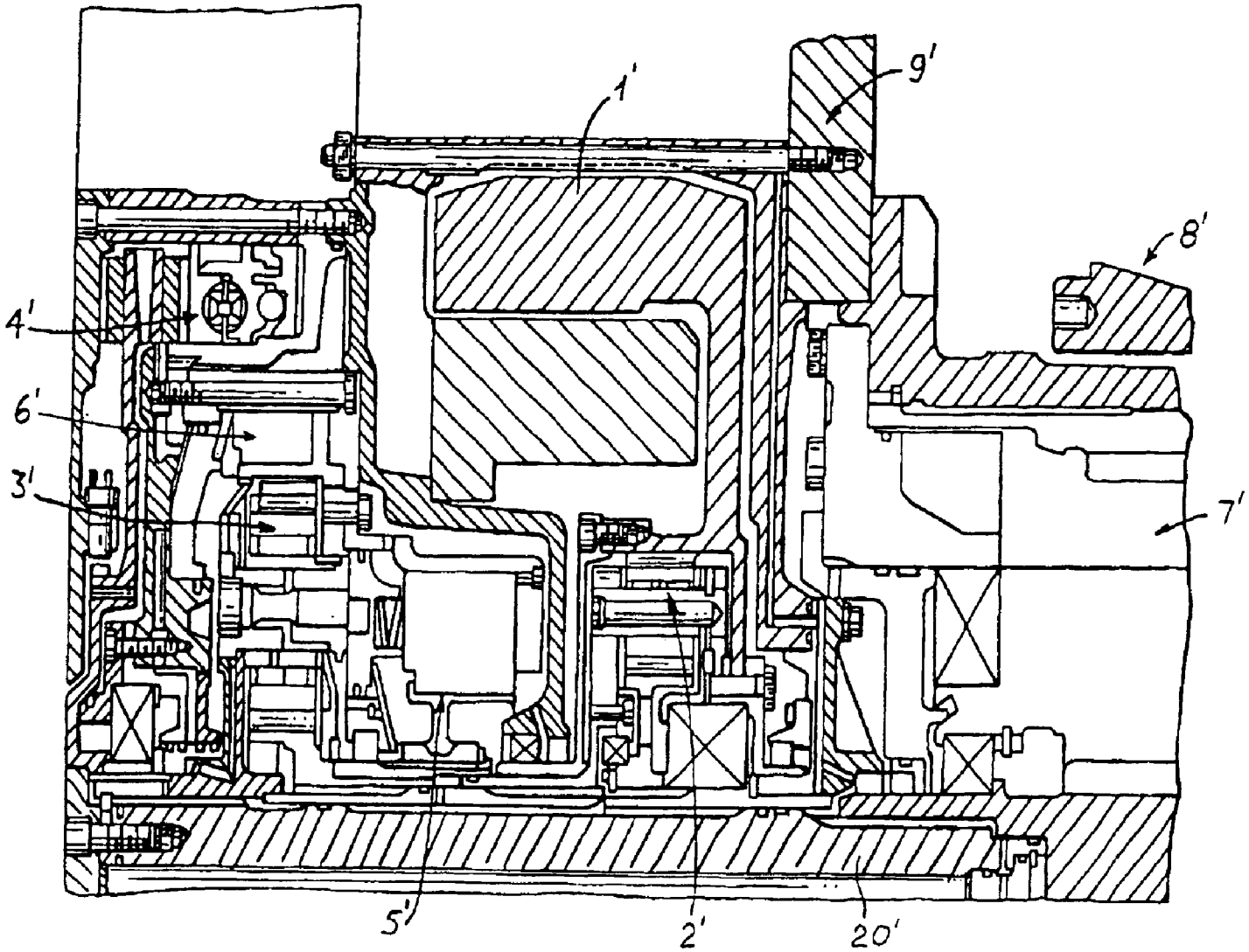
FIG. 2 is a half sectional view of an exemplary embodiment of the drive of the present invention.

A horizontal half section of an exemplary embodiment is shown in FIG. 2. A cup-shaped controllable external-rotor motor 1' can be seen, which drives the ring gear of an epicyclic gear unit 2' and can be optionally coupled in a rotationally locked manner to the output shaft 20' via a multiple-disc clutch 5'. The external-rotor motor 1' thus drives a transmission gear 7' via a fixed gear stage of the epicyclic gear unit 2'. The transmission gear 7' (only partly shown) drives a track sprocket 8' (only depicted in outline).

According to the invention, the arrangement of the epicyclic gear unit 2' and the multiple-disc clutch 5' in the interior can be seen from the enclosure by the cup-shaped external-rotor motor 1'.

A further gear stage of the drive is possible by a shift operation described with reference to FIG. 1, the output shaft 20' being driven via a further multiple-disc clutch 6' and a further epicyclic gear unit 3'. The coaxial arrangement of the epicyclic gear unit 3', of the multiple-disc clutch 6' and of the friction brake 4', in approximately the same plane in series laterally next to the external-rotor motor 1', can likewise be seen.

Figure 3:
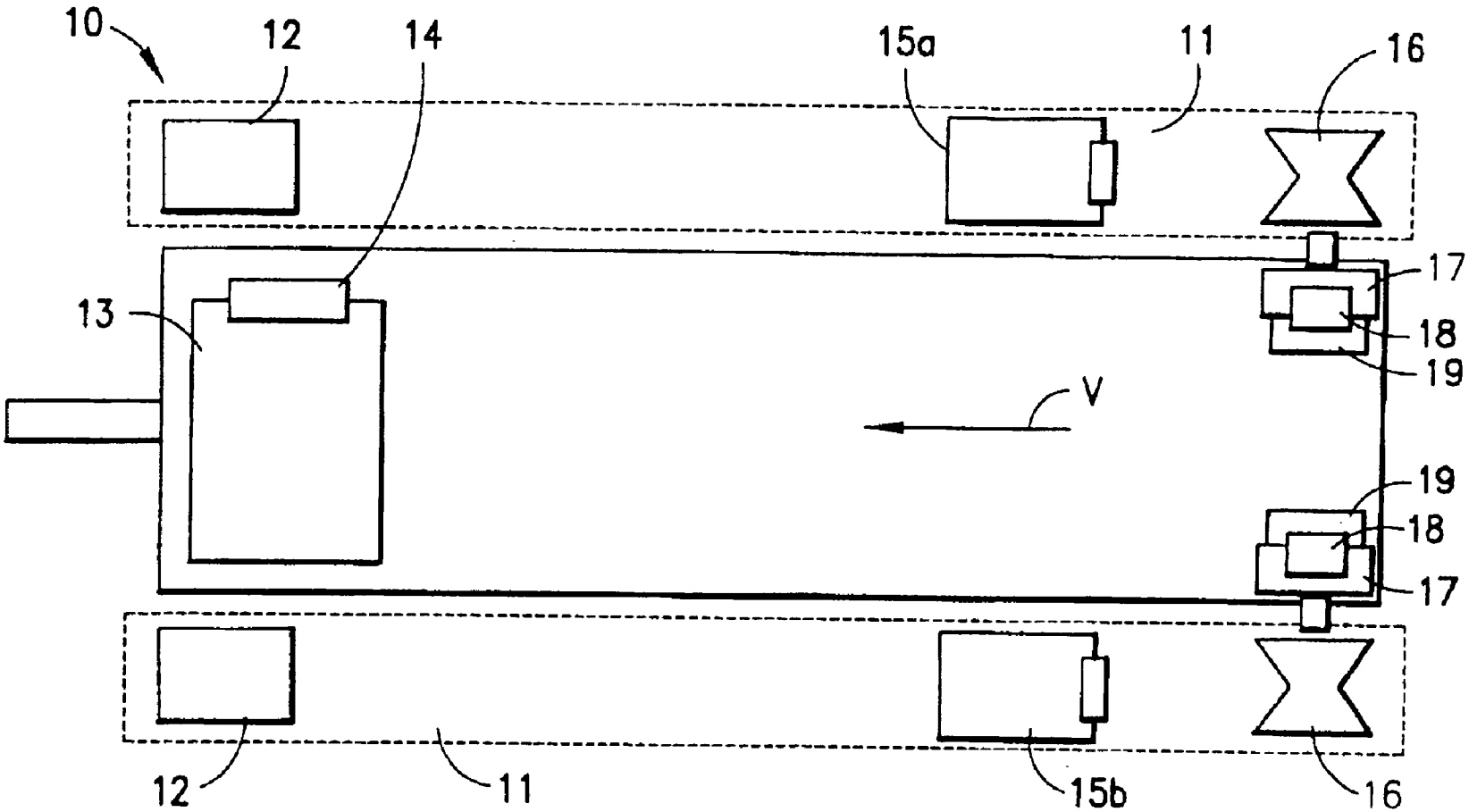
FIG. 3 is a schematic view of the basic arrangement of the drive element in a vehicle according to an embodiment of the invention.

The basic arrangement of the drive elements in a vehicle 10, which moves in the direction of travel V, is shown in FIG. 3. The same parts which occur on both drive sides have been provided with the same reference numerals. Shown symbolically in the front region of the vehicle 10 is an internal combustion engine 13, which drives a generator 14. Shown as an alternative multi-motor concept in the rear side region of the vehicle 10 are two smaller power generating units 15a, 15b, which are arranged, for example, above the track run. The rear drive, in this exemplary embodiment of the vehicle 10 consists of electric traction motors 17, which, by means of multispeed gear units 18, drive final drives having track sprockets 16. In order to meet the demand for maximum braking power as a locking brake when parking, and as an auxiliary brake, each drive is provided with an outer brake 19. In this exemplary embodiment, instead of a second drive for the track 11, in each case a track-deflection roller 12 is installed. This may also be designed the other way round by the drive being effected from the front and by the track-deflection rollers 12 being attached to the rear end of the vehicle 10. Likewise, it is possible to drive a chain 11 in each case at the front and the rear.

As the above description and in particular the drawings show, an essential characterizing feature of the invention consists in the fact that some elements, in the case of an internal-rotor motor, are arranged inside a rotor rotating in the fixed stator and in that, when an external-rotor motor is used, although the elements are likewise arranged inside the external rotor, they are at the same time also arranged inside the fixed internal stator (FIG. 2).

The invention is not limited by the embodiments described above which are presented as examples only but can be modified in various ways within the scope of protection defined by the appended patent claims.

We claim:

1. A drive for *a* track laying [vehicles] *vehicle*, comprising:

an electric traction motor having a rotor;

a shiftable transmission having at least one variable speed mechanical gear stage connected to said rotor and having an output *connectable for driving a track of the track laying vehicle*; and at least one brake connected for acting directly on the output of the at least one variable speed mechanical gear stage *for applying a braking force* for locking the output [and thereby preventing rotation of the output during parking of the vehicle];

wherein at least one of said gear stage and said brake are arranged inside the rotor of the electric motor and the other of said gear stage and said brake are arranged laterally outside the electric motor so as to be arranged coaxially therewith and in substantially the same plane.

2. The drive in accordance with claim 1, wherein said electric traction motor is operable to allow brief operation close to a motor cut-off output.

3. The drive in accordance with claim 1, wherein said at least one brake is arranged proximate a radial outer side of said drive and comprises a radial outer diameter which is approximately the same as a radial outer diameter of said motor.

4. A drive for track laying vehicles comprising:

an electric traction motor having a rotor;

at least one brake;

a first epicyclic gear unit acting as a fixed stage;

a second epicyclic gear unit driven by said first epicyclic gear unit; and a plurality of multiple-disc clutches operably connected to said second epicyclic gear and having an output shaft operably connected with said at least one brake;

wherein said electric traction motor comprises an external-rotor motor, and wherein one of said first and second epicyclic gears and one of said plurality of multiple-disc clutches are arranged one behind the other in an interior region of the external-rotor motor, and the other of said first and second epicyclic gears and another of said plurality of multiple-disc clutches are arranged to lie outside the external-rotor motor coaxially in a plane with said at least one brake in a radial direction from said external-rotor motor.

5. A drive for track laying vehicles comprising:

an electric traction motor having a rotor;

at least one brake;

a plurality of gear stages, and a plurality of clutches, wherein at least one gear stage and at least one clutch are arranged in an interior of the electric motor, and wherein at least another of said gear stages and said clutches in addition to said at least one brake are arranged coaxially with respect to each other an in the same plane outside said electric motor.

*6. The drive in accordance with claim 1, wherein said rotor of said electric traction motor comprises one of an internal and an external rotor.*

* * * * *